United States Patent
Furbeck et al.

(10) Patent No.: US 9,308,497 B2
(45) Date of Patent: Apr. 12, 2016

(54) HYDROCARBON SELECTIVE CATALYTIC REDUCTION CATALYST FOR $NO_x$ EMISSIONS CONTROL

(75) Inventors: Howard Furbeck, Hamilton, NJ (US); Gerald Koermer, Basking Ridge, NJ (US); Ahmad Moini, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 1114 days.

(21) Appl. No.: 13/237,517

(22) Filed: Sep. 20, 2011

(65) Prior Publication Data

US 2012/0082607 A1  Apr. 5, 2012

Related U.S. Application Data

(60) Provisional application No. 61/389,447, filed on Oct. 4, 2010.

(51) Int. Cl.

| | |
|---|---|
| *B01J 23/48* | (2006.01) |
| *B01D 53/94* | (2006.01) |
| *B01J 21/04* | (2006.01) |
| *B01J 23/68* | (2006.01) |
| *B01J 35/04* | (2006.01) |
| *B01J 37/02* | (2006.01) |
| *B01J 37/08* | (2006.01) |
| *B01J 23/00* | (2006.01) |
| *B01J 23/02* | (2006.01) |

(52) U.S. Cl.
CPC ............ *B01D 53/9418* (2013.01); *B01J 21/04* (2013.01); *B01J 23/681* (2013.01); *B01J 35/04* (2013.01); *B01J 37/0201* (2013.01); *B01J 37/0211* (2013.01); *B01J 37/0215* (2013.01); *B01J 37/088* (2013.01); *B01D 2251/208* (2013.01); *B01D 2255/104* (2013.01); *B01D 2255/2092* (2013.01); *B01D 2255/2096* (2013.01); *B01J 23/00* (2013.01); *B01J 23/02* (2013.01); *B01J 23/48* (2013.01)

(58) Field of Classification Search
CPC ...... B01J 53/9418; B01J 53/56; B01J 37/088; B01J 37/0201; B01J 37/0211; B01J 37/0215; B01J 23/681; B01J 35/04; B01J 21/04
See application file for complete search history.

(56) References Cited

U.S. PATENT DOCUMENTS

| | | |
|---|---|---|
| 5,612,009 A | 3/1997 | Fetzer et al. |
| 2002/0091060 A1 | 7/2002 | Cheng et al. |
| 2006/0133976 A1 | 6/2006 | Male et al. |
| 2010/0145127 A1 | 6/2010 | Xie et al. |

FOREIGN PATENT DOCUMENTS

| | | |
|---|---|---|
| EP | 1106592 A1 | 6/2001 |
| EP | 1354626 A1 * | 10/2003 |
| EP | 1541219 A1 | 6/2005 |
| WO | WO 2008084075 A1 * | 7/2008 |

OTHER PUBLICATIONS

Shimizu K., et al. "Selective catalytic reduction of NO over supported silver catalysts—practical and mechanistic aspects", Phys. Chem. Chem. Phys., 2006, vol. 8, pp. 2677-2695.

* cited by examiner

*Primary Examiner* — Melvin C Mayes
*Assistant Examiner* — Smita Patel
(74) *Attorney, Agent, or Firm* — Shruti Costales

(57) ABSTRACT

The present disclosure provides an AgBi catalyst over alumina suitable for performing hydrocarbon selective catalytic reduction (HC-SCR).

20 Claims, 2 Drawing Sheets

HYDROCARBON SELECTIVE CATALYTIC REDUCTION CATALYST FOR NO$_x$ EMISSIONS CONTROL

PRIORITY

This patent application claims priority to patent application Ser. No. 61/389,447 filed Oct. 4, 2010 incorporated in its entirety herein by reference.

GOVERNMENT SUPPORT

The U.S. Government has a paid-up license in this invention and the right in limited circumstances to require the patent owner to license others on reasonable terms as provided for by the terms of DE-FC26-02NT41218 awarded by the U.S. Department of Energy.

BACKGROUND

Traditional three-way catalysts are highly effective at reducing NO and NO$_2$ ("NO$_x$") to N$_2$ in the exhaust of standard gasoline engines. Despite their overall utility, these catalysts are not effective at so called "lean burn" conditions, wherein the exhaust is substantially enriched in oxygen such as in a diesel exhaust or, less commonly, the exhaust from lean burn gasoline engines. At the time three way catalysts were developed, the inability to operate at lean burn conditions was not detrimental as very few engines operated under these conditions. However, as government fuel efficiency requirements have become more stringent, many car manufacturers have opted to use lean burn technology, thus necessitating the development of new catalytic systems capable of reducing NO$_x$ in an oxygen rich environment.

One catalyst capable of operating under lean burn conditions is the hydrocarbon selective catalytic reduction ("HC-SCR") catalyst. The general reaction for the HC-SCR process is: $2NO + "H_2C" + 0.5O_2 \rightarrow N_2 + H_2O + CO_2$ wherein H$_2$C is a hydrocarbon, such as for example, n-octane.

One HC-SCR catalyst system capable of catalyzing the conversion of NO to N$_2$ under lean burn conditions is silver (Ag) supported on alumina. See, e.g., Shimizu, et al., "Selective Catalyst Reduction of NO over Supported Silver Catalysts." *Phys. Chem. Chem. Phys.*, 2006, 8, 2677-2695. Despite the ability of silver on alumina to reduce NO$_x$ under lean burn conditions, the silver/alumina catalyst system is not yet sufficiently developed or understood for deployment in vehicles. Moreover, attempts to optimize the performance of the catalyst have produced mixed results.

For example, in order to achieve the greatest reduction of NO$_x$ products using a silver/alumina HC-SCR catalyst, it may be necessary to vary engine conditions, resulting in reduced fuel efficiency in a given engine. Another shortcoming of the silver/alumina HC-SCR catalyst is its propensity to produce toxic byproducts such as NH$_3$, CH$_3$CN, and HCN. While these molecules can be scrubbed from an exhaust stream using supplemental catalysts, the need to introduce additional catalysts (such as Pt or Pd) increases the overall cost of a catalytic system.

Thus, what is needed is an HC-SCR catalyst capable of more efficiently converting NO$_x$ to N$_2$ under a variety of real world operating conditions. The HC-SCR catalyst should likewise be capable of converting toxic byproducts produced during the HC-SCR reaction to non-toxic, non-polluting compounds or produce no toxic byproducts at all.

SUMMARY

The present disclosure provides a novel alumina supported silver/bismuth catalyst capable of performing HC-SCR in a more effective manner than similar alumina supported silver catalysts known previously. In certain embodiments, the catalyst comprises about 0.1 to about 5.0 weight percent silver on a Ag$_2$O basis, about 0.0075 to about 0.3 weight percent bismuth on a Bi$_2$O$_3$ basis; and about 94.7 to about 99.8925 weight percent alumina.

Throughout the application, the catalyst is described in terms of weight percent silver oxide and bismuth oxide. This is done for purposes of convention only and should not be understood to state or imply that the silver or bismuth is present on the alumina after transfer or calcination as the oxide. Weight percents are indicated on an Ag$_2$O or Bi$_2$O$_3$ basis because it is common practice in elemental analysis data of elements in an oxide matrix to be reported as metal oxides. Moreover, weight percent on an Ag$_2$O basis can be readily converted to weight percent silver by multiplying by the ratio of the atomic weight of silver and the molecular weight of Ag$_2$O. Thus a composition comprising 3 wt % silver on an Ag$_2$O basis actually contains about 2.72 wt % silver. Weight percent on a Bi$_2$O$_3$ basis can be readily converted to weight percent bismuth by multiplying by the ratio of the atomic weight of bismuth and the molecular weight of Bi$_2$O$_3$.

In one embodiment, the present disclosure provides a catalyst comprising about 0.1 to about 5.0 weight percent silver on an Ag$_2$O basis; about 0.0075 to about 0.3 weight percent bismuth on a Bi$_2$O$_3$ basis; and about 94.7 to about 99.8925 weight percent alumina wherein at least about 95 weight percent of the silver in the catalyst is in the non-zero oxidation state.

In certain embodiments, silver comprises about 2 to about 3 weight percent of the catalyst on an Ag$_2$O basis.

In certain embodiments, bismuth comprises about 0.01 to about 0.02 weight percent of the catalyst on a Bi$_2$O$_3$ basis. In other embodiments, bismuth comprises about 0.0075 weight percent of the catalyst on a Bi$_2$O$_3$ basis.

In certain embodiments, the alumina is selected from the group consisting of hydroxylated aluminas, delta alumina, and theta alumina.

The present disclosure further provides a method for preparing a catalyst including about 0.1 to about 5.0 weight percent silver on an Ag$_2$O basis, about 0.0075 to about 0.3 weight percent bismuth on a Bi$_2$O$_3$ basis; and about 94.6 to about 99.8925 weight percent alumina, wherein at least about 95 weight percent of the silver in the catalyst is in the non-zero oxidation state. The method comprises the steps of mixing a known volume of an AgNO$_3$ solution of known molarity with a known volume of a Bi(NO$_3$)$_3$ solution of known molarity to form a mixed solution; adding the mixed solution to a known mass of alumina having a known incipient wetness to form a slurry; optionally, adding additional water to said slurry to achieve said incipient wetness; drying said slurry at about 90° C. for about 16 hours in a convection oven to give a dry powder; calcining said dry powder at about 540° C. for about 2 hours to give calcined material; and steam aging said calcined material at about 650° C. for about 16 hours with about 10% steam in air.

In certain embodiments, the alumina is selected from the group consisting of hydroxylated aluminas, delta alumina, and theta alumina.

In certain embodiments, the silver comprises about 2 to about 3 weight percent of the catalyst on an Ag$_2$O basis.

In certain embodiments, the bismuth comprises about 0.01 to about 0.02 weight percent of the catalyst on a Bi$_2$O$_3$ basis. In other embodiments, the bismuth comprises about 0.0075 weight percent of the catalyst on a Bi$_2$O$_3$ basis.

The present disclosure further provides a monolith comprising a catalyst having about 0.1 to about 5.0 weight percent silver on an Ag$_2$O basis, about 0.0075 to about 0.3 weight percent bismuth on a Bi$_2$O$_3$ basis; and about 94.6 to about 99.8925 weight percent alumina, wherein at least about 95 weight percent of the silver in the catalyst is in the non-zero oxidation state.

In certain embodiments, the silver comprises about 2 to about 3 weight percent of the catalyst on an Ag$_2$O basis.

In certain embodiments, the bismuth comprises about 0.01 to about 0.02 weight percent of the catalyst on a Bi$_2$O$_3$ basis. In other embodiments, the bismuth comprises about 0.0075 weight percent of the catalyst on a Bi$_2$O$_3$ basis.

The present disclosure further provides a method for hydrocarbon selective catalytic reduction of NO$_x$ in an exhaust stream. The method comprises contacting an exhaust stream including NO$_x$ with a catalyst at a first temperature, said catalyst having about 0.1 to about 5.0 weight percent silver on an Ag$_2$O basis, about 0.0075 to about 0.3 weight percent bismuth on a Bi$_2$O$_3$ basis; and about 94.6 to about 99.8925 weight percent alumina; and reducing at least about 50% of said NO$_x$ to N$_2$ with said catalyst thereby reducing NO$_x$ in the exhaust stream. At least about 95 weight percent of the silver in the catalyst used for the selective catalytic reduction of NO$_x$ is in the non-zero oxidation state.

In certain embodiments, the first temperature is from about 330 to about 550° C. In other embodiments, the first temperature is from about 380 to about 450° C.

In certain embodiments, the bismuth is about 0.0075 weight percent of the catalyst on a Bi$_2$O$_3$ basis. In other embodiments, the bismuth is about 0.01 weight percent of the catalyst on a Bi$_2$O$_3$ basis. In a further embodiment, the bismuth is about 0.02 weight percent of the catalyst on a Bi$_2$O$_3$ basis.

BRIEF DESCRIPTION OF THE DRAWINGS

The foregoing summary, as well as the following detailed description the embodiments, will be better understood when read in conjunction with the appended drawings. For the purpose of illustration, there are shown in the drawings some embodiments which may be preferable. It should be understood, however, that the embodiments depicted are not limited to the precise arrangements and instrumentalities shown.

DETAILED DESCRIPTION

Figure 1:
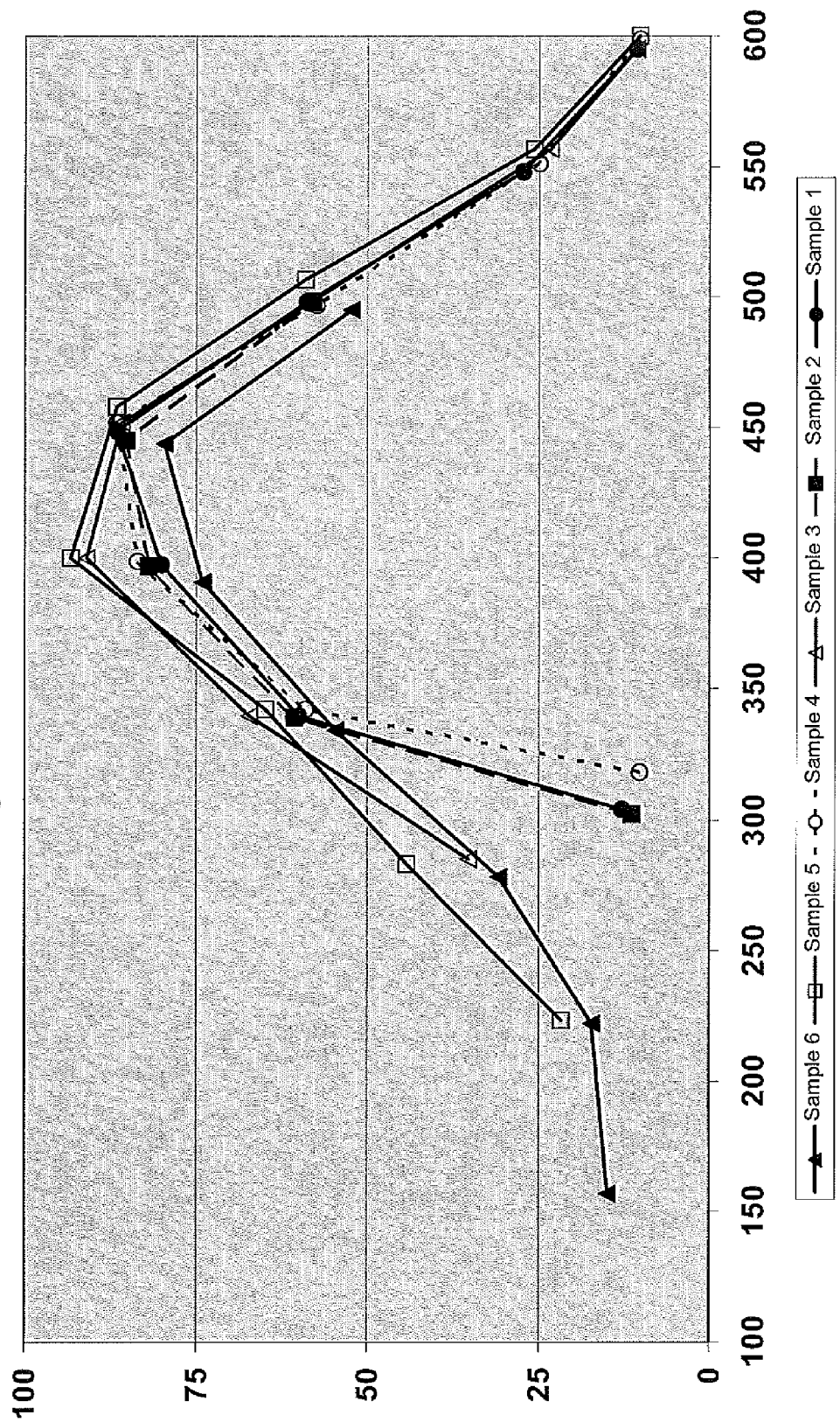
FIG. 1 is a chart depicting the utility of various Ag/Bi catalysts washcoated onto cylindrical monoliths at reducing NO$_x$ to N$_2$.

The present disclosure provides a bismuth-doped silver containing catalyst on alumina capable of performing HC-SCR.

Definitions

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

The phrase "dry" as used herein refers to a state wherein the weight of an object heated to a temperature sufficient to drive off water via evaporation, does not change over time at said temperature, or changes very little, because all water capable of being driven off has been. All drying takes place at atmospheric pressure.

As used herein, the word "water" means de-ionized water.

The Catalyst

Throughout the application, the catalyst is described in terms of weight percent silver oxide (Ag$_2$O) and bismuth oxide (Bi$_2$O$_3$). This is done for purposes of convention only and should not be understood to state or imply that the silver or bismuth is present on the alumina after transfer or calcination as the oxide. Weight percents are indicated on an Ag$_2$O or Bi$_2$O$_3$ basis because it is common practice in elemental analysis data of elements in an oxide matrix to be reported as metal oxides. Moreover, weight percent on an Ag$_2$O basis can be readily converted to weight percent silver by multiplying by the ratio of the atomic weight of silver and the molecular weight of Ag$_2$O. Thus a composition comprising 3 wt % silver on an Ag$_2$O basis actually contains about 2.72 wt % silver. Weight percent on a Bi$_2$O$_3$ basis can be readily converted to weight percent bismuth by multiplying by the ratio of the atomic weight of bismuth and the molecular weight of Bi$_2$O$_3$.

The catalyst described herein can comprise about 0.1 to about 5.0 weight percent silver on an Ag$_2$O basis, inclusive of any whole or partial increment there between. In another embodiment, the catalyst can comprise from about 1 to about 3.5 weight percent silver on an Ag$_2$O basis. In still another embodiment, the catalyst can comprise from about 2 to about 3 weight percent silver on an Ag$_2$O basis.

The bismuth content can be from about 0.0075 to about 0.3 weight percent on a Bi$_2$O$_3$ basis, as well as any whole or partial increment there between. In another embodiment, the bismuth content can be about 0.01 to about 0.1 weight percent on a Bi$_2$O$_3$ basis. In certain embodiments, the bismuth content can about 0.01 to about 0.02 weight percent on a Bi$_2$O$_3$ basis. In certain embodiments, the bismuth content of the catalyst can be about 0.01 weight percent on a Bi$_2$O$_3$ basis. In another embodiment, the bismuth content can be about 0.02 weight percent on a Bi$_2$O$_3$ basis. In still another embodiment, the bismuth content can be about 0.0075 weight percent on a Bi$_2$O$_3$ basis.

The catalyst can further comprise from about 94.7 to about 99.8925 weight percent alumina. Hydroxylated aluminas, examples of which include, but are not limited to, boehmite, pseudoboehmite, and gamma alumina, can be used to prepare the catalyst described herein. Alternatively, the alumina can be delta or theta alumina. In certain embodiments, the alumina is a pseudoboehmite such as CATAPAL® C-1.

Although Ag/Bi catalysts have been disclosed elsewhere in the literature, the present catalyst may be distinguished from these earlier disclosures. For example, U.S. Patent App. Pub. No. 2006/0133976 discloses an Ag/Bi catalyst over an alumina support having a substantially higher minimum bismuth content than the presently disclosed catalyst. For example, the catalyst described in U.S. 2006/0133976 has, at minimum, at least 3 weight % (~1 mol %) bismuth. This amount is nearly 10 times greater than the highest bismuth content of the catalysts described herein.

The catalyst described herein can likewise be distinguished from the catalyst disclosed in EP 1541219, which discloses a catalyst comprising silver and a second metal oxide selected from oxides of Co, Ni, Cu, Mn, Fe, Zn, Ce, Pr, or Bi. The catalyst described by EP 1541219 can contain anywhere from 1 to 40 mol % silver. The molar ratio of silver to second metal oxide is anywhere from 5/1 to 1/2. The remaining molar component is alumina. Thus, in weight percents, EP1541219 discloses a catalyst that can comprise, at a minimum, about 1 weight % Ag$_2$O and no less than 0.4 weight % Bi$_2$O$_3$ (assuming 1 mol % Ag$_2$O and a 5:1 ratio of silver to Bi$_2$O$_3$). The catalyst described herein, though, comprises substantially less bismuth.

Moreover, EP1541219 describes that its catalyst is able to remove $NO_x$ from exhaust gasses at low temperatures (20-200° C.) without the need for the addition of a gaseous reductant. As is set forth elsewhere, though, the catalyst herein described operates at a substantially higher temperature and requires a gaseous reductant (hydrocarbon) for the HC-SCR reaction to operate. Thus, EP 1541219 teaches away from the utility of Ag/Bi catalysts for the HC-SCR reaction and does not teach or suggest the present weight distribution of the components of the catalyst described herein.

The catalyst described herein can also be distinguished from the catalyst disclosed in U.S. Pat. No. 5,612,009. The catalyst disclosed in U.S. Pat. No. 5,612,009 is an Ag catalyst over an alumina support and may contain a bismuth oxide dopant. Unlike the present catalyst, though, the silver in the catalyst disclosed in U.S. Pat. No. 5,612,009 is silver metal, e.g. $Ag^0$. This difference is critical as it has been surprisingly found that in order to effectively facilitate $NO_x$ reduction under HC-SCR conditions, the catalyst described herein must present silver in a non-zero oxidation state.

For the catalyst described herein, at least about 95 weight percent of the silver present in the catalyst can be in the non-zero oxidation state. In other embodiments, the weight percent of silver in the non-zero oxidation state can be at least about 97 weight percent, at least about 99 weight percent, or at least about 99.9 weight percent.

EXAMPLES

The catalyst disclosed herein is now further detailed with reference to the following examples. These examples are provided for the purpose of illustration only and the catalyst disclosed herein should in no way be construed as being limited to these examples but rather should be construed to encompass any and all variations which become evident as a result of the teaching provided herein. Comparative catalyst examples are likewise provided and contain no bismuth.

Example 1

Preparation of a Catalyst Comprising 3 Weight % Silver on an $Ag_2O$ Basis, 0.01 Weight % Bismuth on a $Bi_2O_3$ Basis, with the Remainder Being Alumina The following example is premised on a 50 g catalyst sample, of which about 3 weight % is silver on an $Ag_2O$ basis, about 0.01 weight % is bismuth on a $Bi_2O_3$ basis, and about 96.99 weight percent is alumina. The general procedure described below may be modified, as would be understood by a chemist of ordinary skill in the art, to produce catalysts having any weight percent Ag, Bi, or alumina within the ranges defined herein.

In order to prepare the catalyst, a solution of 0.5 M $Bi(NO_3)_3$ in water was prepared by adding 12 g of $Bi(NO_3)_3$ to a 50 ml volumetric flask. Subsequently, about 25 ml of water was added to the volumetric flask. Next, concentrated nitric acid (about 16 M) was added to the solution drop-wise until the $Bi(NO_3)_3$ dissolved. Additional water was then added to the volumetric flask until the flask reached 50 ml. If at any time prior to reaching 50 ml, a precipitate formed, more nitric acid was added.

Following preparation of the bismuth solution, a 1M solution of silver nitrate was prepared by adding 17 g of $AgNO_3$ to a 100 ml volumetric flask and subsequently adding sufficient water to reach the 100 ml mark on the neck of the flask. The flask was then shaken until all of the silver salt was dissolved. This solution was stored in the dark due to its light sensitivity.

Next, the incipient wetness of a 1 g sample of CATAPAL® C-1 was determined. To measure this value, the 1 g sample was placed in a plastic vial. Water was added to the alumina in increments of 10 weight % of the total weight of the alumina (0.1 ml amounts), mixing the water and the alumina vigorously with each addition. As the point of incipient wetness was approached, the CATAPAL® C-1 began to stick together as a solid mass. As the solid mass began to form, water was added dropwise until the point of incipient wetness was reached. The incipient wetness for 1 g of CATAPAL C-1 was 0.76086 ml/g. Thus, for 48.5 g (96.99 weight % of a 50 g sample) of CATAPAL® C-1, the total volume of water required to reach incipient wetness was about 38.0 ml.

As a result, 13 ml of $AgNO_3$ (0.013 mol Ag) solution was mixed with 0.043 ml of the $Bi(NO_3)_3$ solution (0.0000215 mol Bi). Subsequently, 25 ml of water was added to this mixture to reach the incipient wetness volume for 48.5 g CATAPAL® C-1, e.g. 38.0 ml. The well mixed solution was then added to a 48.5 g sample of CATAPAL® C-1 with occasional stirring to ensure uniformity. The mixture was then dried at 90° C. for 16 hours in a convection oven at atmospheric pressure and subsequently calcined at 540° C. for 2 hours in a box oven, also at atmospheric pressure. Finally, the catalyst powder was steam aged at 650° C. for 16 hrs using 10% steam in air.

Example 2

Catalyst Washcoating on a Monolith Support

In the following example, a cylindrical cordierite monolith having a cell density of 400 cells per square inch was used. The cylinder had a diameter of 0.75 inches, a height of 2 inches, and a volume (calculated) of 0.88 $in^3$. The monolith had a mass of 3.5 g.

In order to washcoat the monolith, about 15 g of the impregnated powder prepared in Example 1 was suspended in about 35 g of water and placed in a ball-mill. The powder was milled until about 90% of the particles were between about 11 and about 9 microns as measured by a Sympa Tec model HD23xx particle size distribution analyzer. Subsequently, the slurry was removed from the ball-mill and the percent solids of the slurry were measured by a Sartorius MA50 gravimetric moisture analyzer. For the present example, an about 30 weight % solids slurry was prepared. The solids level may, however, be varied anywhere between about 1 weight % and about 35 weight % solids, depending upon the washcoat loading desired.

Next, the wet gain (g) needed to achieve the desired washcoat loading was calculated. Wet gain may be calculated according to the following formula:

$$WetGain = \frac{TargetWashcoatLoading * MonolithVolume * 100}{Weight\ \%\ SolidsInSlurry}$$

wherein TargetWashcoatLoading is measured in $g/in^3$. In the present example, a TargetWashcoatLoading of about 2.71 $g/in^3$ was desired. Thus, the wet gain was calculated to be about 7.94 g of slurry. The TargetWashcoatLoading can be varied as needed, within the limits of the size and loading capacity of a given monolith, both of which can be readily determined by a person of ordinary skill in the art.

Next the total wet weight target (g) was calculated. This value is simply the sum of the weight of the uncoated monolith (dry) and the calculated wet gain. In the present example, the target was 11.44 g (3.5 g+7.94 g).

Next, the monolith was submerged in the slurry, open channels down. The monolith was maintained in the slurry for about 30 seconds in order to allow the monolith to absorb the slurry. The monolith was then removed and the excess slurry was allowed to drain from the channels. In certain embodiments, the monolith was turned 180° (flipped) when it was removed from the slurry.

Excess slurry was then removed from the outside of the monolith and the channels of the monolith were cleared with an air-knife. Additional slurry was then removed until the desired wet gain was obtained and all the channels were clear. Once the desired wet gain was obtained, the monolith was placed in a convection drying oven at about 110 to about 120° C. and dried for about 1 to about 12 hours, as necessary, to obtain a dry coated monolith.

The dry coated monolith was then weighed and the dry weight gain was calculated. If the dry weight was low, additional loading, as set forth above, was undertaken. When the desired weight gain was observed, the monolith was calcined at about 540° C. for about 2 hours and then steam aged at about 650° C. for about 16 hours in a flow of about 10% steam in air.

Table 1, below, details several examples of washcoated monoliths prepared according to the general preparative procedure set forth in example 1 (catalyst) and example 2 (monolith).

TABLE 1

| Sample | Ag on an $Ag_2O$ Basis (Weight %) | Bi on a $Bi_2O_3$ Basis (Weight %) | Calcination Temp (° C.) | Washcoat Loading (g/in$^3$) | Cell Density (cells/in$^2$) |
|---|---|---|---|---|---|
| 1 | 3 | 0.01 | 540 | 2.92 | 400 |
| 2 | 3 | 0.01 | 700 | 2.75 | 400 |
| 3 | 3 | 0.02 | 540 | 2.9 | 400 |
| 4 | 3 | 0.02 | 700 | 3.16 | 400 |
| 5 | 3 | 0.0075 | 540 | 2.54 | 400 |
| 6 | 3 | 0 | 700 | 2.71 | 400 |

Example 3

Performance of the Catalyst in Monolith Form

The catalysts described in Table 1 (Samples 1-6) were subject to testing with simulated gasoline. Analysis of the performance of these samples was accomplished using a tubular flow through reactor. The reactor system was instrumented with a Fourier transform infrared spectrometer to determine $NO_x$ concentration levels (and other species) entering/exiting the HC-SCR catalyst. The reactor system further included a flow meter to determine exhaust flow rate. Exhaust flow rate can be translated to catalyst space velocity (SV). Space velocity can be calculated by dividing the flow rate (volume/hour) of the gas exiting the monolith by the total volume of the catalyst monolith.

Baseline laboratory conditions included the following standard gases in the simulated exhaust feedstream: 10% $O_2$, 5% $CO_2$, 5% $H_2O$, 750 parts per million (ppm) CO, and 250 ppm $H_2$. The remainder of the gas comprised a simulated gasoline mixture as the $NO_x$ reductant and consisted of the volumetric mixture set forth in Table 3. The performance of the various catalyst monoliths under these test conditions are detailed in FIG. 1.

According to FIG. 1, the monolith loaded with a slurry containing 0.0075 weight percent bismuth on a $Bi_2O_3$ basis provided the greatest reduction of NOx (greater than about 85% conversion) over a relatively broad temperature range of about 380 to about 450° C. The catalyst with 0.02 weight percent bismuth on a $Bi_2O_3$ basis performed nearly as well, but did not provide quite as complete % conversion. From about 330 to about 550° C., all of the catalysts described herein performed better than the all silver control and provided at least about 50% reduction of $NO_x$ to $N_2$.

Example 4

Microchannel Reactor Performance

The performance characteristics of the catalysts described in Table 1 prepared as set forth in Example 1, were evaluated in a microchannel reactor. For purposes of the present example, the catalyst disclosed in Table 1 were not loaded onto a monolith and were used as catalyst powders. The 0.0075 weight % bismuth on a $Bi_2O_3$ basis sample was not subjected to the microchannel reactor evaluation. In addition, an additional control sample ("Control 1") was evaluated. This sample was identical to sample 6 in composition, but was calcined at 540° C. rather than 700° C.

For purposes of the present example, 15 cc/min of reactive feed gases were passed over a pellet of 12.6 mm$^3$ of catalyst loaded into a 4 mm×1 mm catalyst well disposed within a microchannel reactor. The feed gas included the components shown in Table 2. Steam was introduced to the feed mixture as 5% of the dry flow rate prior to the catalyst bed. Catalyst activity was evaluated at 150, 175, 200, 225, 250, 300, 350, 400, and 500° C.

TABLE 2

| Gas | % |
|---|---|
| NO | 0.0400 |
| $CO_2$ | 5.00 |
| O2 | 10.00 |
| CO | 0.075 |
| $H_2$ | 0.025 |
| Hydrocarbon | 0.050 |
| He | 84.81 |
| Total | 100 |

Hydrocarbon, as used in Table 2, is a mixture of the components noted in Table 3.

TABLE 3

| Component | Weight % |
|---|---|
| Iso-octane | 41.3 |
| m-xylene | 38.0 |
| 1-octene | 11.4 |
| n-octane | 9.3 |

The concentration of reactants fed into the microchannel reactor and products recovered from the reactor were determined by mass spectral analysis of the feed gas and product gases. Percent $NO_x$ conversion in the microchannel reactor was calculated according to the following equation:

$$\text{Percent } NO_x \text{ conversion} = 100 * ([NO_x]_{inlet} - [NO_x]_{outlet}) / [NO_x]_{inlet}$$

wherein $[NO_x]_{inlet}$ is the concentration of $NO_x$ fed to the catalyst and $[NO_x]_{outlet}$ is the concentration of $NO_x$ in the gas stream after contacting the catalyst.

Figure 2:
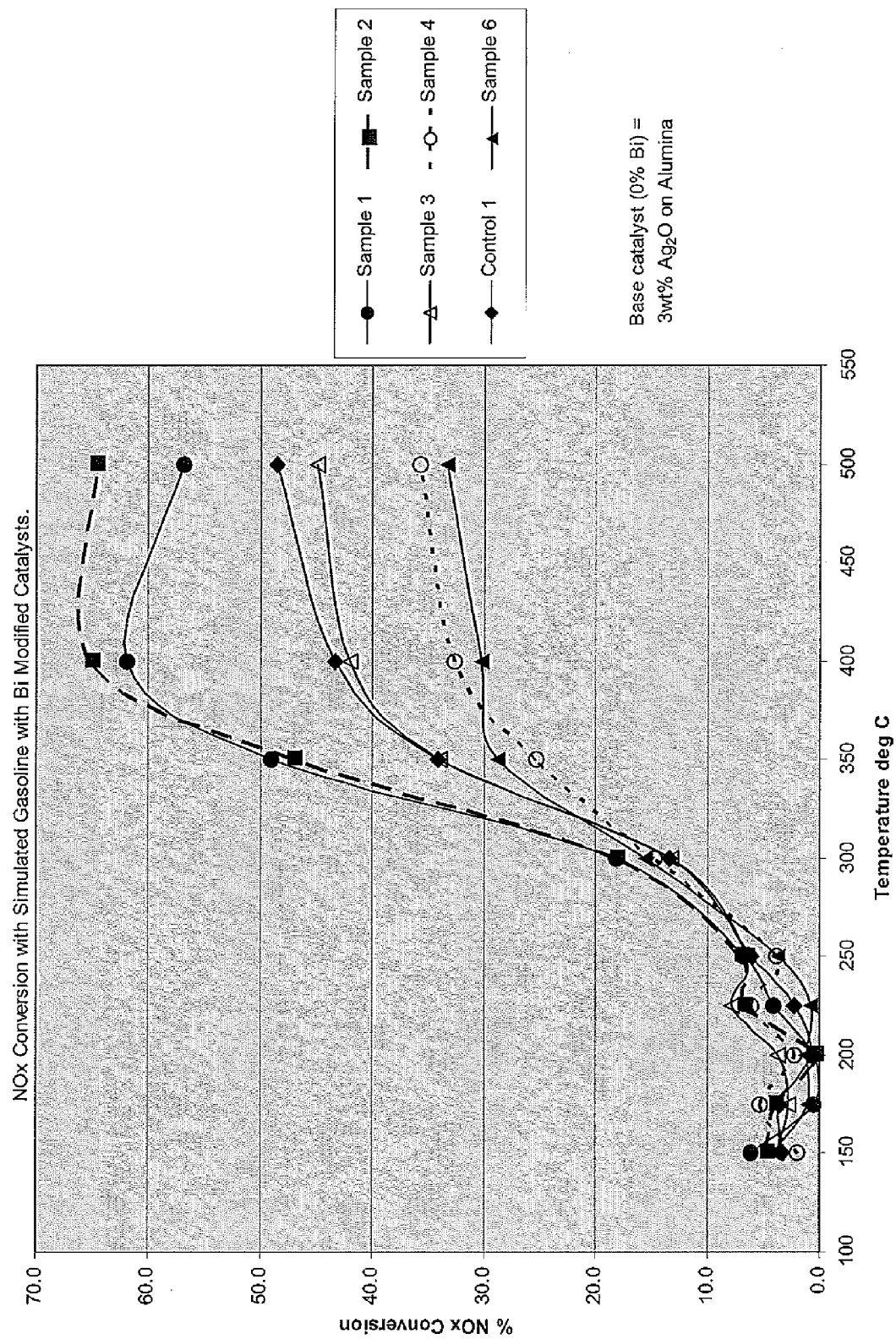
FIG. 2 is a chart depicting the ability of various Ag/Bi catalysts to reduce NO$_x$ to N$_2$ using simulated gasoline in a microchannel reactor.

The results of the microchannel reactor tests are detailed in FIG. 2 and show that the catalysts containing 0.01 weight percent bismuth ($Bi_2O_3$ basis), regardless of calcination temperature, performed substantially better than their 0.02 weight percent bismuth ($Bi_2O_3$ basis) counterparts.

Although the results of Examples 3 and 4 suggest an apparent discrepancy as to which Bi-doped Ag catalyst performs the best, these differences are attributable to differences in the scale of the reactors used to test the catalysts. That said, the results of both Examples 3 and 4 clearly indicate that the performance of the Bi doped Ag HC-SCR catalyst, on scale, is better than currently available non-Bi doped Ag HC-SCR catalysts.

The disclosures of each and every patent, patent application, and publication cited herein are hereby incorporated herein by reference in their entirety.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A hydrocarbon selective catalytic reduction catalyst for hydrocarbon selective catalytic reduction of $NO_x$ in an exhaust stream, the catalyst comprising:
   a) about 0.1 to about 5.0 weight percent silver on an $Ag_2O$ basis;
   b) about 0.0075 to about 0.3 weight percent bismuth on a $Bi_2O_3$ basis; and
   c) about 94.7 to about 99.8925 weight percent alumina,
   wherein the hydrocarbon selective catalytic reduction catalyst is capable of reducing at least about 50% of $NO_x$ to $N_2$ in the exhaust stream, and
   wherein at least about 95 weight percent of the silver in the catalyst has a non-zero oxidation state.

2. The catalyst according to claim 1, wherein said silver comprises about 2 to about 3 weight percent of the catalyst on an $Ag_2O$ basis.

3. The catalyst according to claim 1, wherein said bismuth comprises about 0.01 to about 0.02 weight percent of the catalyst on a $Bi_2O_3$ basis.

4. The catalyst according to claim 1, wherein said bismuth comprises about 0.0075 weight percent of the catalyst on a $Bi_2O_3$ basis.

5. The catalyst according to claim 1, wherein the alumina is selected from the group consisting of hydroxylated aluminas, delta alumina, and theta alumina.

6. A method for preparing a hydrocarbon selective catalytic reduction catalyst for hydrocarbon selective catalytic reduction of $NO_x$ in an exhaust stream including about 0.1 to about 5.0 weight percent silver on an $Ag_2O$ basis, about 0.0075 to about 0.3 weight percent bismuth on a $Bi_2O_3$ basis; and about 94.6 to about 99.8925 weight percent alumina, wherein the hydrocarbon selective catalytic reduction catalyst is capable of reducing at least about 50% of NO to N in the exhaust stream and wherein at least about 95 weight percent of the silver in the catalyst has a non-zero oxidation state, said method comprising:
   a) mixing a known volume of an $AgNO_3$ solution of known molarity with a known volume of a $Bi(NO_3)_3$ solution of known molarity to form a mixed solution;
   b) adding the mixed solution to a known mass of alumina having a known incipient wetness to form a slurry,
   c) optionally, adding additional water to said slurry to achieve said incipient wetness;
   d) drying said slurry at about 90° C. for about 16 hours in a convection oven to give a dry powder;
   e) calcining said dry powder at about 540° C. for about 2 hours to give calcined material; and
   f) steam aging said calcined material at about 650° C. for about 16 hours with about 10% steam in air.

7. The method of claim 6, wherein the alumina is selected from the group consisting of hydroxylated aluminas, delta alumina, and theta alumina.

8. The method of claim 6, wherein said silver comprises about 2 to about 3 weight percent of the catalyst on an $Ag_2O$ basis.

9. The method of claim 6, wherein said bismuth comprises about 0.01 to about 0.02 weight percent of the catalyst on a $Bi_2O_3$ basis.

10. The method of claim 6, wherein said bismuth comprises about 0.0075 weight percent of the catalyst on a $Bi_2O_3$ basis.

11. A monolith comprising a hydrocarbon selective catalytic reduction catalyst for hydrocarbon selective catalytic reduction of $NO_x$ in an exhaust stream, the catalyst having about 0.1 to about 5.0 weight percent silver on an $Ag_2O$ basis, about 0.0075 to about 0.3 weight percent bismuth on a $Bi_2O_3$ basis; and about 94.6 to about 99.8925 weight percent alumina,
   wherein the hydrocarbon selective catalytic reduction catalyst is capable of reducing at least about 50% of $NO_x$ to $N_2$ in the exhaust stream, and
   wherein at least about 95 weight percent of the silver in the catalyst has a non-zero oxidation state.

12. The monolith according to claim 11, wherein said silver comprises about 2 to about 3 weight percent of the catalyst on an $Ag_2O$ basis.

13. The monolith according to claim 11, wherein said bismuth comprises about 0.01 to about 0.02 weight percent of the catalyst on a $Bi_2O_3$ basis.

14. The monolith according to claim 11, wherein said bismuth comprises about 0.0075 weight percent of the catalyst on a $Bi_2O_3$ basis.

15. A method for hydrocarbon selective catalytic reduction of $NO_x$ in an exhaust stream, said method comprising:
   a) contacting an exhaust stream including $NO_x$ with a hydrocarbon selective catalytic reduction catalyst at a first temperature, said catalyst having about 0.1 to about 5.0 weight percent silver on an $Ag_2O$ basis, about 0.0075 to about 0.3 weight percent bismuth on a $Bi_2O_3$ basis; and about 94.6 to about 99.8925 weight percent alumina; and
   b) reducing at least about 50% of said $NO_x$ to $N_2$ with said catalyst thereby reducing $NO_x$ in the exhaust stream;
   wherein at least about 95 weight percent of the silver in the catalyst has a non-zero oxidation state.

16. The method according to claim 15, wherein said first temperature is from about 330 to about 550° C.

17. The method according to claim 16, wherein said first temperature is from about 380 to about 450° C.

18. The method according to claim 15, wherein said bismuth is about 0.0075 weight percent of said catalyst on a $Bi_2O_3$ basis.

19. The method according to claim 15, wherein said bismuth is about 0.01 weight percent of said catalyst on a $Bi_2O_3$ basis.

20. The method according to claim 15, wherein said bismuth is about 0.02 weight percent of said catalyst on a $Bi_2O_3$ basis.

\* \* \* \* \*